A. BIAGI AND G. CASALIS.
THREE WHEELED SELF PROPELLED VEHICLE.
APPLICATION FILED JAN. 30, 1920.
1,371,842. Patented Mar. 15, 1921.
8 SHEETS—SHEET 3.
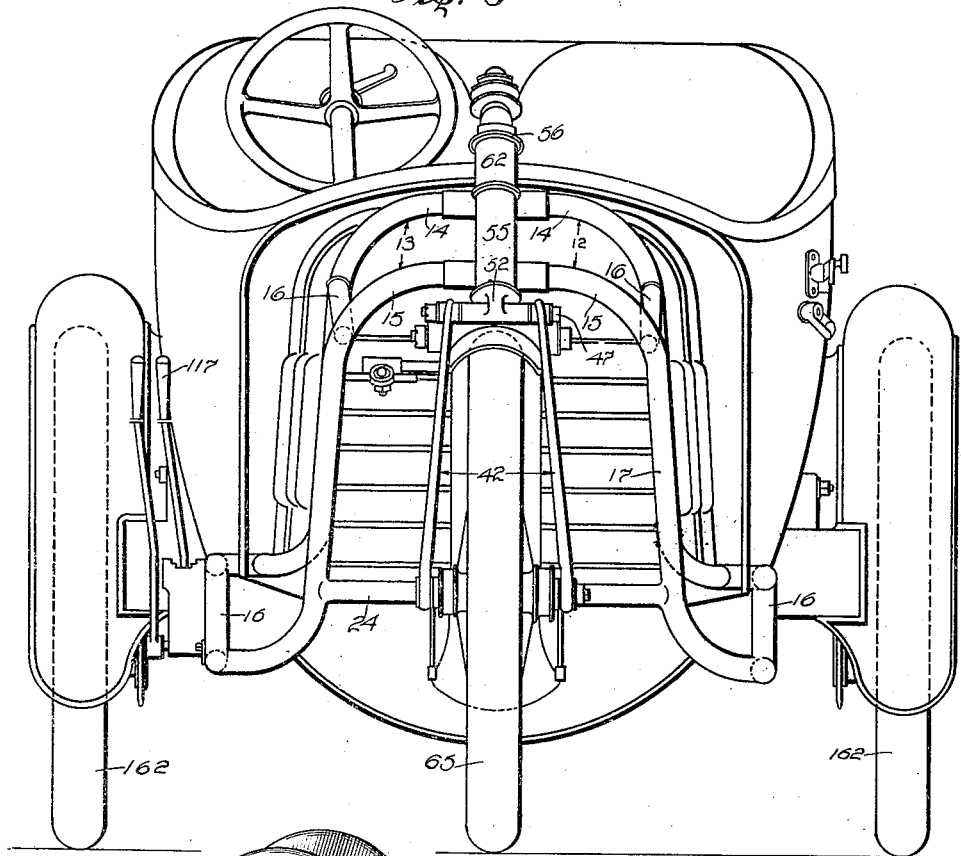
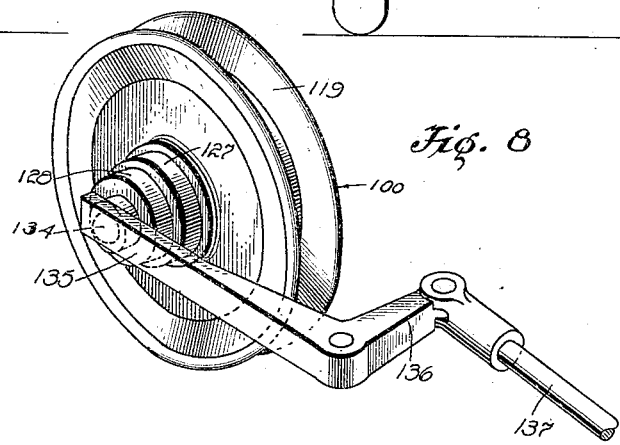
Inventor
Albert Biagi
Giacomo Casalis
By  Attorney

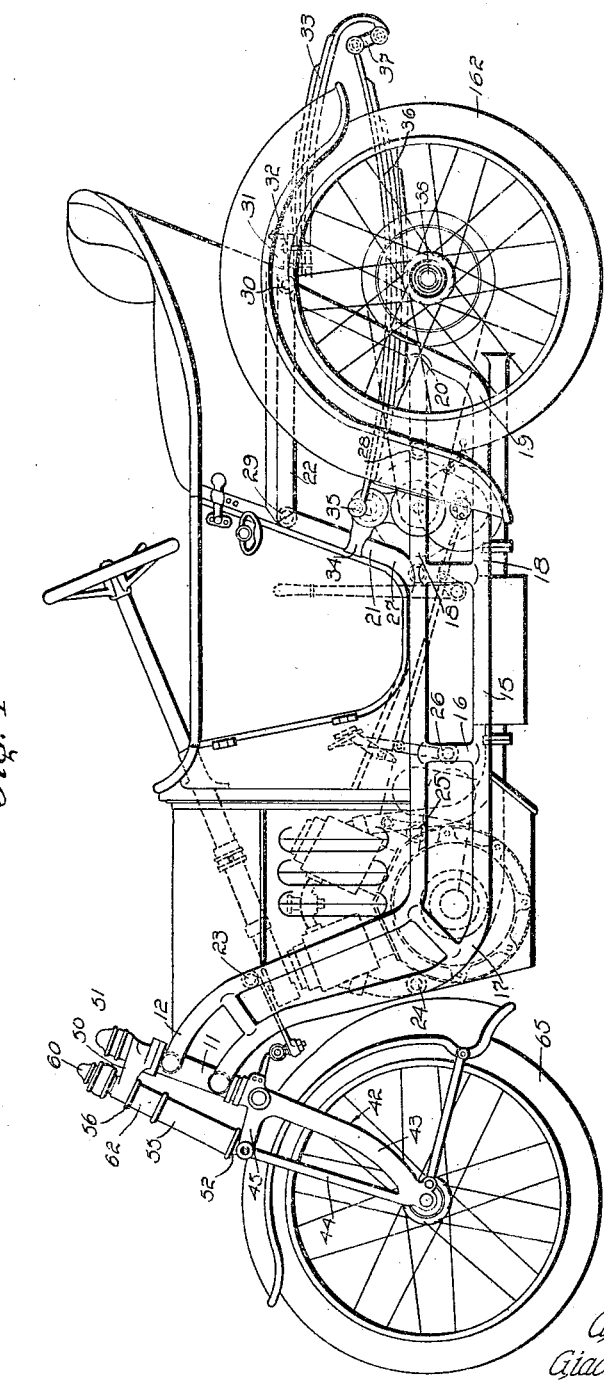

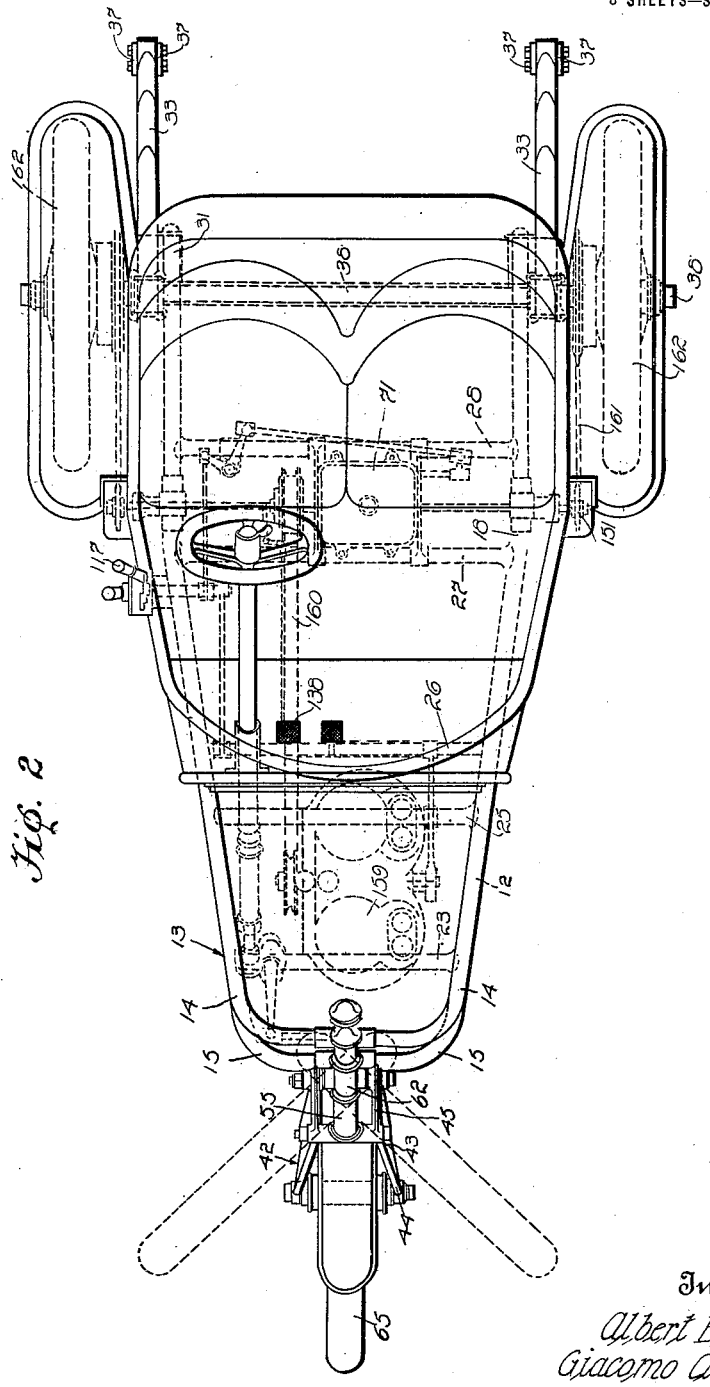

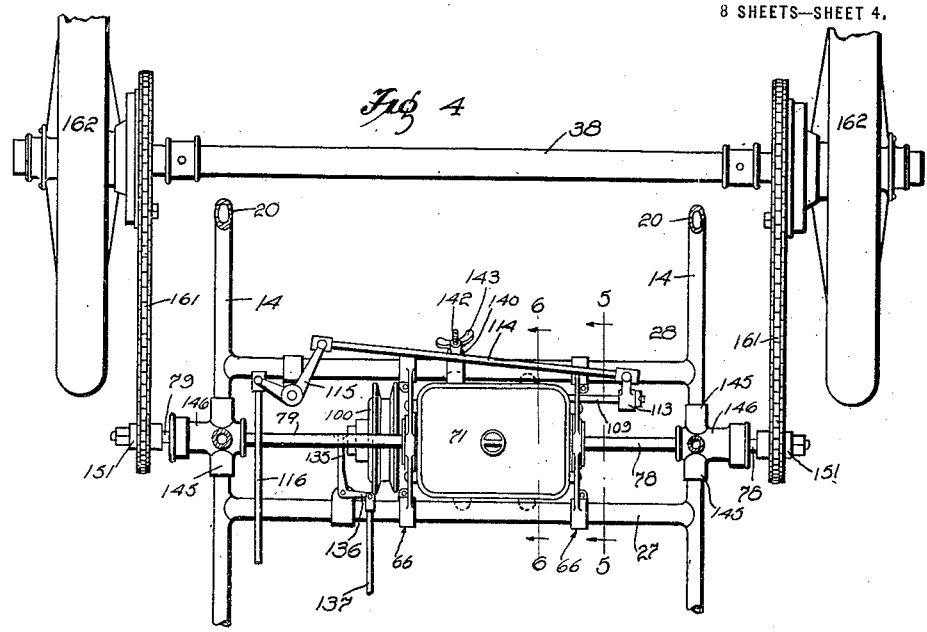
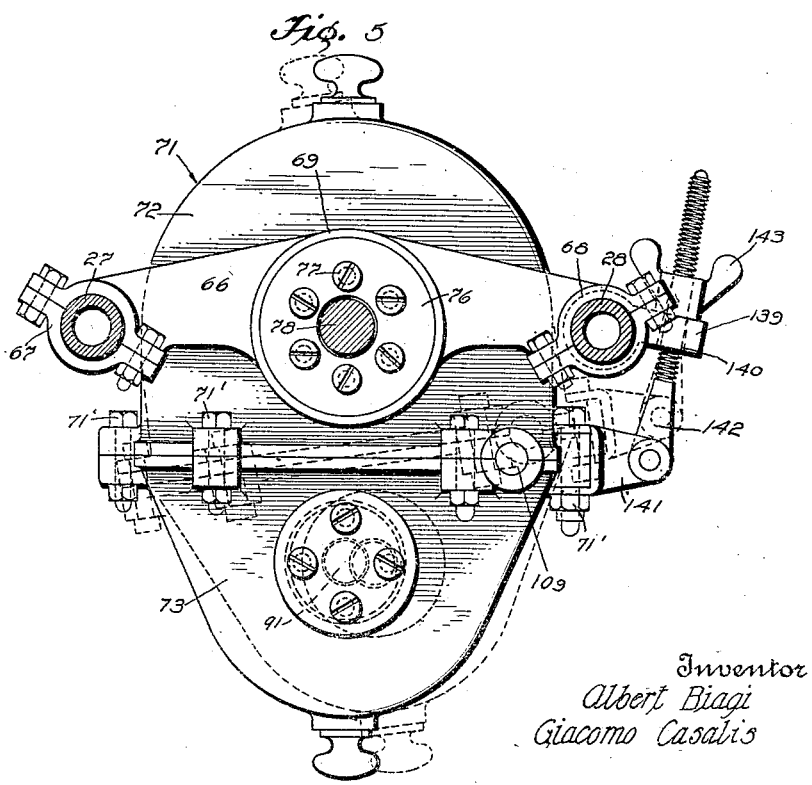

A. BIAGI AND G. CASALIS.
THREE WHEELED SELF PROPELLED VEHICLE.
APPLICATION FILED JAN. 30, 1920.
1,371,842.
Patented Mar. 15, 1921.
8 SHEETS—SHEET 5.
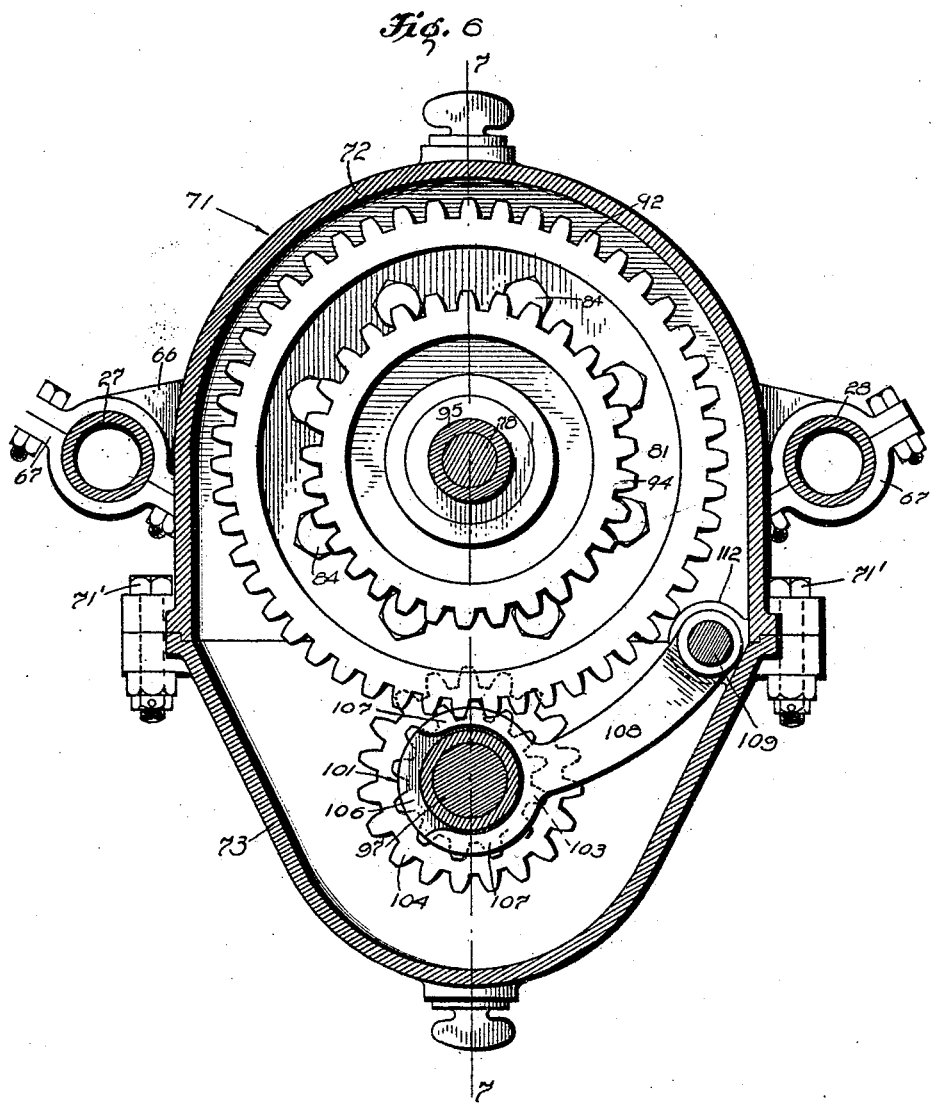
Inventor
Albert Biagi
Giacomo Casalis
By
C. H. Parker Attorney

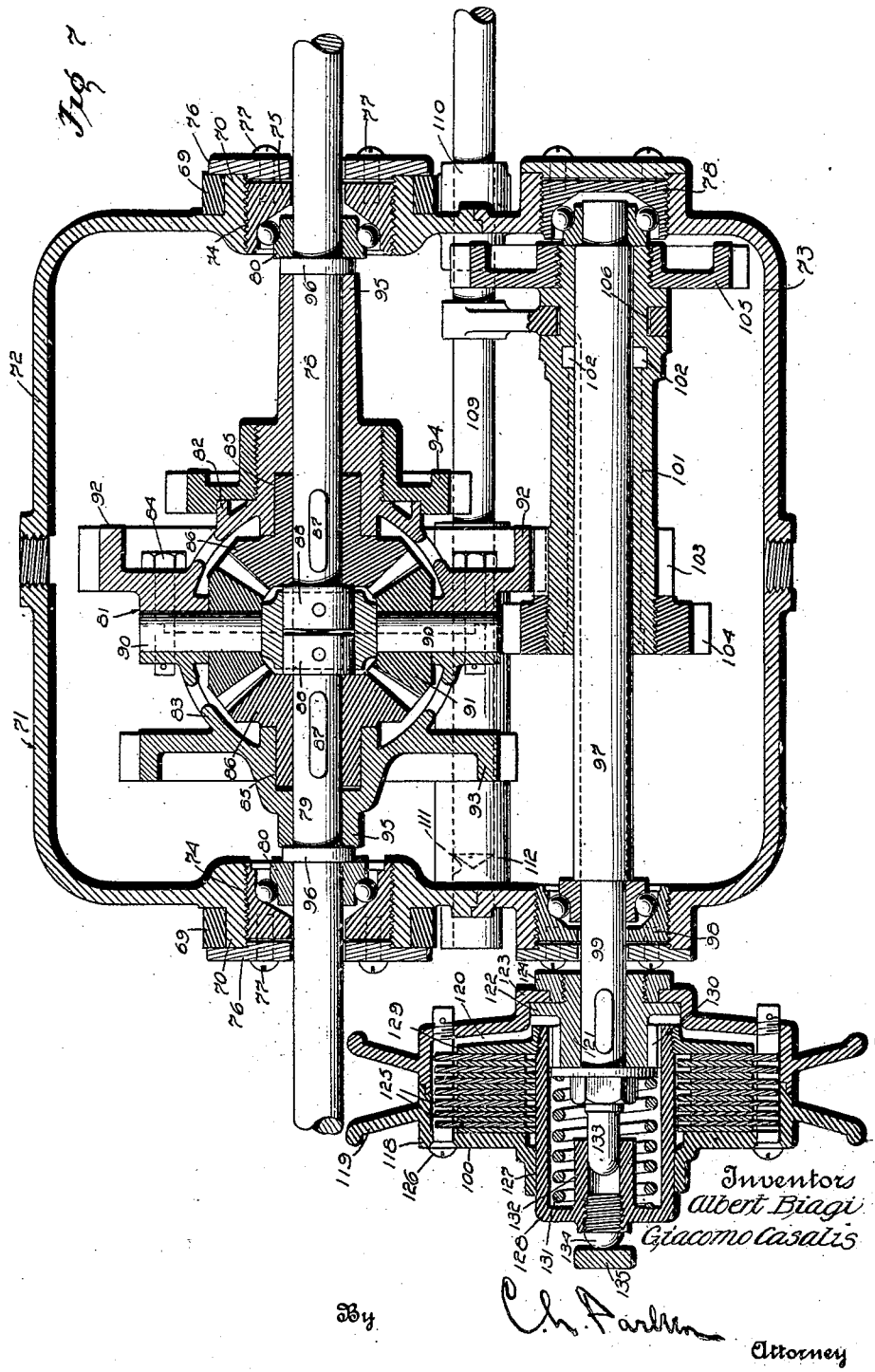

A. BIAGI AND G. CASALIS.
THREE WHEELED SELF PROPELLED VEHICLE.
APPLICATION FILED JAN. 30, 1920.
1,371,842.
Patented Mar. 15, 1921.
8 SHEETS—SHEET 7.
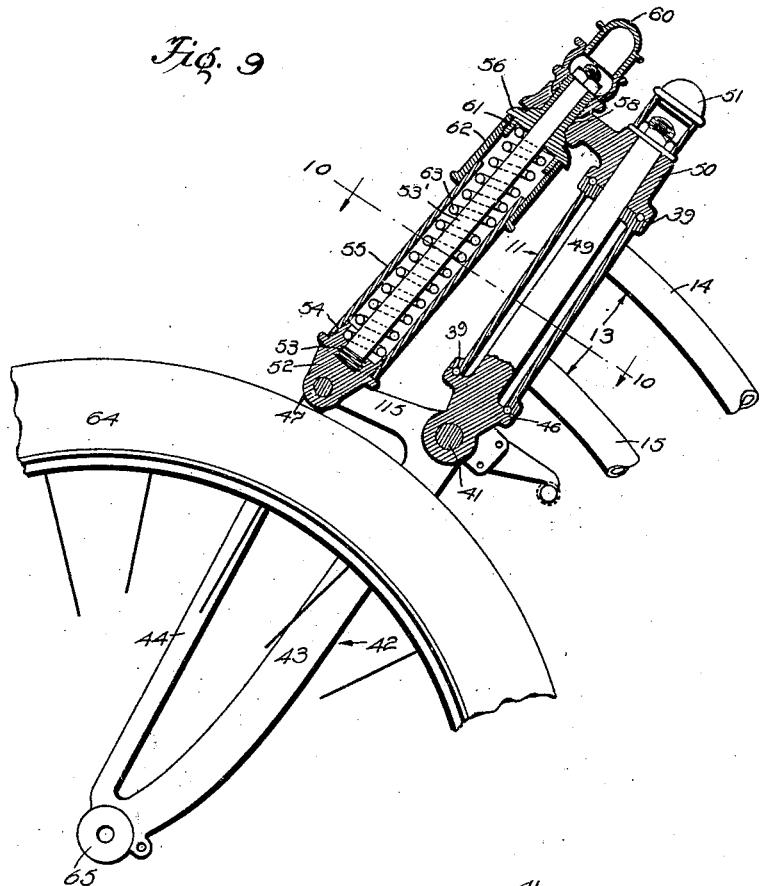
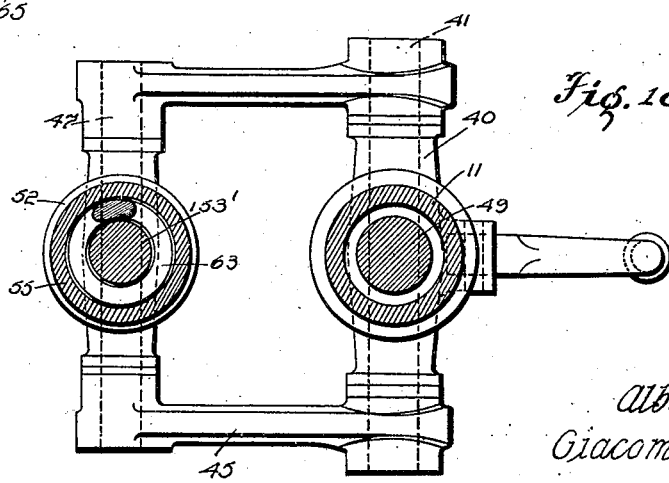
Inventor
Albert Biagi
Giacomo Casalis
By
Ch. Farbken Attorney

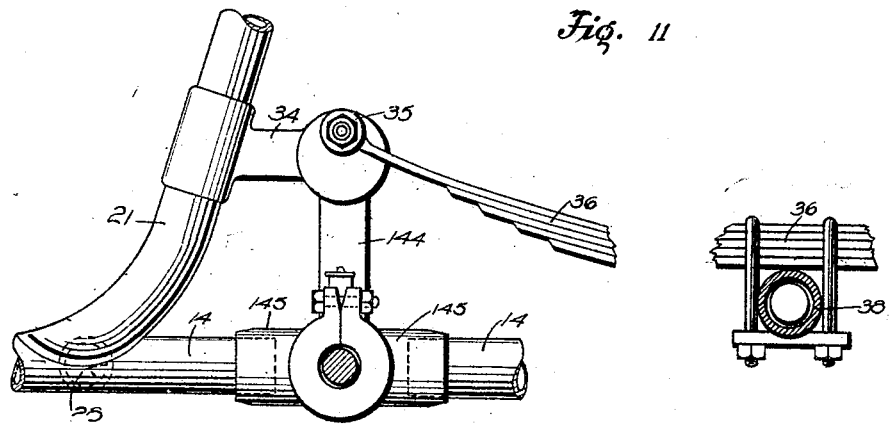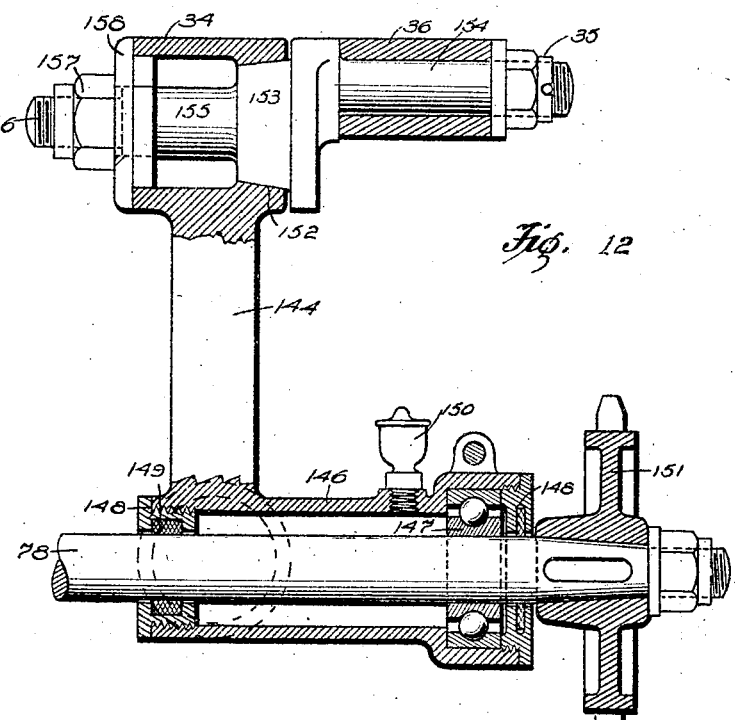

UNITED STATES PATENT OFFICE.

ALBERT BIAGI AND GIACOMO CASALIS, OF SCHENECTADY, NEW YORK.

THREE-WHEELED SELF-PROPELLED VEHICLE.

1,371,842.  Specification of Letters Patent.  Patented Mar. 15, 1921.

Application filed January 30, 1920. Serial No. 355,108.

*To all whom it may concern:*

Be it known that we, ALBERT BIAGI and GIACOMO CASALIS, a citizen of the United States and a subject of the King of Italy, respectively, residing at Schenectady, in the county of Schenectady and State of New York, have invented certain new and useful Improvements in Three-Wheeled Self-Propelled Vehicles, of which the following is a specification.

This invention relates to improvements in three wheeled self propelled vehicles.

An important object of the invention is to produce such a vehicle which is pleasing to the eye and at the same time strongly constructed.

A further object is to provide a novel combined transmission and differential.

A further object is to provide a novel suspension in this type of vehicle whereby construction of the vehicle is greatly simplified.

A further object is to provide an adjustable flexible drive for such vehicles, consisting of a drive from the motor to the transmission and a second drive from the transmission to the driving wheels both of which drives are accomplished by belts or chains and may be readily adjusted.

Other objects and advantages will be apparent throughout the course of the following description.

In the accompanying drawings wherein for the purpose of illustration is shown a preferred embodiment of our invention and wherein like numerals designate like parts throughout, Figure 1 is a side elevation of a vehicle constructed in accordance with our invention.

Fig. 2 is a plan view thereof.

Fig. 3 is a front elevation thereof.

Fig. 4 is a view showing the mounting of the differential and transmission and the drives to the rear axles.

Fig. 5 is a section taken on the line 5—5 of Fig. 4.

Fig. 6 is a section taken on the line 6—6 of Fig. 4.

Fig. 7 is a section taken on the line 7—7 of Fig. 6.

Fig. 8 is a perspective showing the operation of the clutch releasing pedal.

Fig. 9 is a section showing the front fork suspension.

Fig. 10 is a section taken on the line 10—10 of Fig. 9.

Fig. 11 is an enlarged detail view of the drive shaft mounting and rear axle adjustment, and Fig. 12 is a section on the line 12—12 of Fig. 11.

Referring now more particularly to the drawings the numeral 11 indicates the front fork suspension receiving member to which are secured supporting frames 12 and 13. These supporting frames each comprise an upper tubular member 14 and a lower tubular member 15 which are, as clearly shown in Figs. 1 and 2 substantially parallel throughout the major portion of their length.

The frame members 12 and 13 diverge from the member 11 as clearly shown in Figs. 1 and 2 and then extend downwardly to a point 17 where they turn rearwardly and are disposed parallel to the ground. The members 14 and 15 of each of the side members are spaced and connected by cross bars 16. By inspecting Fig. 2 it will be seen that the side members 12 and 13 of the frame diverge rearwardly until they arrive at a point 18 from which they extend rearwardly in substantially parallel horizontal planes.

The rear end of the lower member 15 of each side member is turned upwardly as at 19, the upper member 14 continuing rearwardly and joining the lower member as at 20. Secured to the upper member is an upwardly extending member 21 which is connected at its upper end with a horizontal member 22 which has its opposite end connected with the upper end of the member 15.

Adjacent their forward ends the upper members 14 of the frame members 12 and 13 are connected by a cross bar 23 which forms a support for the forward end of the steering mechanism. Adjacent the point 17 of the side members the lower members 15 are connected by a cross bar 24, and the upper members 14 are connected by a cross bar 25. The cross bars 24 and 25 lie in substantially the same horizontal plane and form engine supports.

Rearwardly of the engine supports a pair of alined cross bars 16 are connected by a cross member 26, which forms a support for the foot operated controls of the vehicle. Adjacent the rear end of the vehicle the members 15 are connected by a pair of cross braces 27 and 28 which form a support for the transmission and differential gearing. At the junction of the members 21 and 22, the side members are connected by a cross bar 29 which forms the forward support for the seats of the vehicle. At the juncture of the members 15 and 22 the side members 12 and 13 are connected by a cross bar 30 which forms a support for the rear portion of the seat and for the back portion of the body.

The ends of the member 22 extend rearwardly as at 31 and have mounted thereon shackle plates 32 which support the forward end of the upper quarter 33 of a three quarter elliptic spring. A member 34 is secured to each of the members 21 of the side frames and has mounted therein an eccentric 35 to which is secured the forward end of a half elliptic spring 36 having its rear end connected with the spring 33 by means of links 37. It will be obvious that the rear axle 38 being secured to the spring 36 may be adjusted rearwardly by adjusting the eccentric 35. The operation and construction of the parts 34 and 35 and their associated elements will be hereinafter more fully described.

The member 11 which connects the forward ends of the side frames 12 and 13 is tubular in form and is provided upon its upper and lower ends with one half of a ball race 39. A member 40 is provided having pivotally mounted therein a shaft 41 to which are pivotally connected the sides 42 of the front fork. Each of the sides of the front fork comprises downwardly extending members 43 and 44 which are joined at their lower ends and a cross member 45 which connects the members 43 and 44 at their upper ends. The point of pivotal connection of the sides 42 to the shaft 41, lies in the junction of the arm 43 with the connecting member 45.

The member 40 is provided with a flange 46 having a groove formed therein adapted to coöperate with the ball race 39 on the lower end of the member 11. A shaft 49 extends upwardly from the member 40 through the member 11 and has mounted upon its upper end and secured thereto a yoke 50. The upper end of the shaft 49 is screw threaded to receive a nut for holding the yoke 50 in position, and this end of the shaft and the nut are covered by a suitable ornamental cap 51. The lower face of the yoke 50 is provided with a groove adapted to coöperate with ball race 39 formed on the upper end of the member 11.

The member 52 is provided having a shaft 47 rotatably mounted therein which shaft is in turn connected with side members 42 of the fork at the juncture of the sections 44 and 45 thereof. The member 52 has an internally threaded bore adapted to receive the screw threaded lower end of a shaft 53'. This member is also provided with an externally threaded flange 54 to receive the lower end of an internally threaded casing 55. Slidably mounted upon the upper end of the shaft 53' is a collar 56 having a reduced upper end 57 which extends through a bore 58 formed in the yoke 50. A keeper 59 has threaded engagement with the upper end of the reduced portion 57 and holds the member 56 firmly in position upon the member 50. The upper end of the shaft 53' is provided with a nut to limit the upward movement of the member 56 and the upper end of the shaft and the nut are covered by a suitable ornamental cap 60.

The collar 56 is provided with a downwardly extending externally threaded flange 61 upon which is mounted a tubular socket 62 which slidably receives the upper end of the casing 55. Mounted within the casing 55 about the shaft 53' and extending between the members 52 and 56 is a compression spring 63. The wheel 65 is rotatably mounted between the side members 42 of the forks and connected thereto at the juncture 64 of the arms 43 and 44 thereof. It will be seen that if the wheel 65 is driven upwardly, the sleeve 55 is free to move upwardly within the guide 62 and will be returned to its original position by the spring 63.

Mounted upon the cross bars 27 and 28 are spaced yokes 66, these yokes each embodying clamping ends 67 and 68 which firmly engage the cross bars 27 and 28 respectively. Each of the yokes is provided approximately centrally thereof with an opening forming a journal 69 for the reception of outstanding flanges 70 formed upon opposite ends of the transmission and differential gear casing 71.

The casing 71 is formed in two sections 72 and 73 bolted together as at 71', the flanges 70 being formed upon the upper section 72 of the casing. The flanges 70 surround interiorly threaded openings 74 which receive externally threaded members 75 forming one-half of a thrust ball bearing. Cover plates 76 are provided, held in position by means of screws 77 engaging the members 75. The members 75 and plates 76 are provided with central apertures which receive drive shafts 78 and 79, the interior ends of the drive shafts abutting as clearly shown in Fig. 7. Mounted upon each of the shafts 78 and 79 is a member 80 which forms the remaining half of the thrust bearing.

A member 81 is provided composed of two sections 82 and 83 secured together by means of bolts 84 or the like, the members 82 and 83 being mounted upon the shafts 78 and 79 respectively. Each of the members 82 and 83 is provided with a recess 85 adapted to rotatably receive the shank of a bevel gear 86 mounted upon the shaft and secured thereto as at 87. The gears 86 form the drive gears of a differential. The inner ends of the shafts 78 and 79 are provided with fixed collars 88 held in position by pins 89 or the like to prevent inward movement of the gears 86. Mounted in the member 81 are stub shafts 90 provided with idler pinions meshing with the gears 86. It will be seen that the member 81 forms the ring gear of the differential.

Formed integrally with the member 82 is a gear 92 hereinafter to be referred to as the low speed gear; formed integrally with the member 83 is a gear 93 hereinafter to be referred to as the intermediate gear, and secured to the member 82 is yet a third gear 94 hereinafter referred to as the high speed gear. The high speed gear may if so desired be formed integrally with the member 82, but for the purpose of convenience in assembling we prefer that this gear be formed separately and attached to the member. The ends of the members 82 and 83 are elongated to form sleeves 95 extending adjacent the members 80 and spaced therefrom by collars 96. It will be obvious that looseness in the differential may be taken up by adjusting either of the thrust collars 75.

Mounted in the section 73 of the casing 71 is a shaft 97 having its ends reduced and provided with thrust collars 98 similar to those provided on the shafts 78 and 79. One end of the shaft 97 projects through the casing as at 99 and is provided with a clutch 100 to be hereinafter more particularly described.

Mounted upon the shaft 97 for reciprocation is a composite gear 101 provided with keys 102 operating in grooves formed in the shaft 97. This composite gear member 101 is provided with a small gear 103 adapted to coact with the low speed gear 92 and intermediate speed gear 104 adapted to coact with the intermediate gear 93 and a large gear 105 adapted to coact with the high speed gear 94. The member 101 is provided with a groove 106 adapted to receive the forked arms 107 of a lever 108. This lever is secured to a shaft 109 slidably mounted in the casing 101 as at 110 and having one end mounted in the bore 111 of a tubular member 112 secured to or formed upon the interior of the casing. The end of the shaft 109 which projects beyond the casing is provided with a member 113 which is pivotally connected with a link 114. The opposite end of the link is pivotally connected with one arm of a bell crank 115 and the other arm of the bell crank 115 is pivotally connected with a link 116 which is operatively connected with a gear shifting lever 117. It will be obvious that by shifting the lever 117 any of the pairs of gears may be brought into engagement. It will also be seen that intermediate each engagement point there is a neutral point at which none of the gears are in engagement.

The clutch 100 embodies an outer casing member 118 provided upon its outer face with a drive receiving medium 119. The casing 118 is so formed as to provide an annular internal chamber 120. Secured to the end 99 of the shaft 97 is a member 121 embodying an annular flange 122. The casing 118 is provided with an inwardly extending flange 123 adapted to abut the inner face of the flange 122. A removable collar 124 is supplied for retaining the flange 123 and casing 118 in position.

Mounted within the chamber 120 are the disks of a disk clutch, each alternate disk 125 being secured to the casing 118 as by means of a screw or screws 126 extending through notches formed in the disks. The casing 118 is provided with an upstanding flange 127 forming a guide for a tubular member 128 having its outer end closed. The remaining disks of the clutch are secured to this tubular member. The tubular member is provided with an outstanding flange 129 which extends into the chamber 120 and engages against the innermost of the disks. This tubular member is secured as at 130 against rotation with relation to the member 121 secured to the shaft 97. Mounted within the tubular member is a spring 131 which acts against the inner face of the closed end of the tubular member and against the end of the tubular member 121 normally forcing the tubular member outwardly and causing the flange thereof to compress the plates and thereby operatively connect the tubular member with the casing 118. Extending inwardly from the outer end of the tubular member 128 is a guide 132 which receives a member 133 connected with the shaft 97 and serving to hold the tubular member properly positioned and alined.

The outer end of the guide 132 is internally threaded to adjustably receive a member 134. Against the member 134 bears one end of one arm 135 of a bell crank lever which is pivotally mounted upon the cross brace 27. To the other arm 136 of the bell crank is pivotally connected one end of a link 137, the opposite end of the link being operatively connected with the foot pedal 138.

In the present instance we have shown the clutch 100 provided with a V groove adapted to receive a driven belt 160 from the engine 159. As these belts in use become loose it is necessary to provide some means for tightening the same. Such a means we have provided by securing to the cross brace 28 a member 139 having an opening 140 formed therein. Secured to the casing 71 by means of one of the bolts 71' is a member 141 having pivotally connected thereto a screw 142 which extends through the opening 140 of the member 139. It will be obvious that as the casing 71 is pivotally mounted adjacent its upper ends in the yokes 66, that by adjusting the screw, the casing may be shifted upon its pivot. Thus by tightening the nut 143 upon the screw the lower half of the casing is shifted rearwardly and consequently the clutch 100 is moved away from the engine and the belt 160 will be tightened.

The member 34 above mentioned embodies the vertical portion 144 provided upon its end with oppositely extending sockets 145 which receive the ends of sections of the member 14 of the side frames 12 and 13. Extending outwardly at right angles to the sockets 145 and lying in approximately the same horizontal plane therewith is a tubular member 146 also formed integrally with the vertical portion 144 of the member 34. This tubular member is adapted to receive the outer end of the drive shaft, being shown in present instance as supporting the end of the shaft 78. It will be obvious that a similar construction is employed upon the opposite side of the machine to support the outer end of the shaft 79.

The tubular member 146 is provided interiorly with a ball bearing 147 in which the shaft 78 is journaled. The ends of the tubular member are closed by means of screw plates 148 provided with packing 149 which engages the shaft 78. The purpose of this packing is to prevent the loss of the oil grease used for lubricating the shaft and which may be introduced through the grease cup 150 mounted in the tubular member. The outer end of the shaft 78 is provided with a sprocket gear 151, which drives a chain 161 which passes about a sprocket secured to the rear wheel 162.

The upper end of the vertical member 144 is provided with the eccentric 35 hereinbefore mentioned. The member 144 is provided at its upper end with a tapered tubular socket 152 adapted to receive the tapered face of a member 153. This member 153 is provided upon its outer face with a shaft 154 set at a point eccentric to the axis thereof, and this shaft receives the forward end of the spring 36. The inner end of the member 153 is reduced as at 155 and threaded as at 156 for the reception of an adjusting nut 157. This adjusting nut 157 bears against the plate 158 through which the reduced portion 155 extends.

It will be obvious that by loosening the adjusting nut 157, the cone face 153 of the member 35 will be released from engagement with the member 144 and the member 35 may accordingly be rotated to adjust the position of the shaft 154 thereof and accordingly the position of the spring 36. When the desired position has been attained the nut 157 may be tightened and the spring held in such position. As the rear axle 38 is secured to the springs 36 and is shifted therewith, and the relation between the members 144 and the sprocket 151 does not change this shifting of the rear axle will adjust the chains which connect the sprockets 151 with the rear wheel 162.

As many changes are possible in the shape, size, and arrangement of the various parts herein shown and described, we do not limit ourselves to the particular construction herein set forth, but may make any such changes without departing from the spirit of the invention, or the scope of the subjoined claims.

What we claim is:

1. In a vehicle of the type described, a frame, drive shafts rotatably mounted in opposite sides of said frame, a rear axle, drive wheels mounted thereon, chains connecting said drive wheels and said drive shafts, resilient members secured to said axle and to the frame adjacent the rear end thereof and forming a support for the rear end of said frame, and means for adjusting said resilient members longitudinally of said frame, comprising eccentrics rotatably mounted in said frame to which the forward ends of said springs are secured.

2. In a vehicle of the type described, a frame embodying a pair of frame sections joined at their forward ends, each of said frame sections comprising upper and lower tubular members substantially parallel throughout their length and rigidly connected at spaced points, the rear ends of said lower tubular members inclining upwardly and rearwardly, said upper tubular members extending rearwardly and joining the inclined portions of said lower tubular members intermediate the ends thereof and being secured thereto, supporting members secured to said upper tubular members forwardly of the ends thereof and inclining upwardly and rearwardly, horizontal members secured forwardly to said supports and rearwardly to the upper ends of the inclined portions of said lower tubular member, a transverse member connecting the upper ends of said supports, and a transverse member connecting the upper ends of the inclined portions of said lower tubular member, said transverse members forming supports for the seats of the vehicle.

3. In a vehicle of the type described, a frame embodying a pair of frame sections joined at their forward ends, each of said frame sections comprising upper and lower tubular members substantially parallel throughout their length and rigidly connected at spaced points, the rear ends of said lower tubular members inclining upwardly and rearwardly, said upper tubular members extending rearwardly and joining the inclined portions of said lower tubular members intermediate the ends thereof and being secured thereto, supporting members secured to said upper tubular members forwardly of the ends thereof and inclining upwardly and rearwardly, horizontal members secured forwardly to said supports and rearwardly to the upper ends of the inclined portions of said lower tubular members, a transverse member connecting the upper ends of said supports, a transverse member connecting the upper ends of the inclined portions of said lower tubular member, said transverse members forming supports for the seats of the vehicle, springs secured to said horizontal portions and extending rearwardly of said frame members connected rearwardly to said springs and capable of a limited longitudinal movement with relation thereto, an axle secured to said last named members, and means adjustably connecting the forward ends of said members and said frame sections.

4. In a vehicle of the type described, a frame, an engine mounted forwardly therein, drive shafts mounted in said frame, a casing pivotally mounted in said frame and in which the inner ends of said drive shafts are rotatably mounted, differential gearing within said casing and connecting the inner ends of said shafts, a shaft rotatably mounted in said casing eccentrically to the pivotal point thereof, a driving belt connecting said shaft and said engine, gearing connecting said last named shaft and the ring gear of said differential gearing, and means for adjustably rotating said casing upon its pivot.

5. In a vehicle of the type described, a frame, an engine mounted forwardly of said frame, a unitary transmission embodying clutch, change speed gear, and differential elements, mounted substantially centrally of said frame, a pair of drive wheels, flexible driving elements connected between the differential and the drive wheels, a flexible driving element connected between the engine and the clutch, means for adjusting the tension of said first named flexible elements, and independent means for adjusting the tension of said last named flexible element.

6. In a vehicle of the type described, a frame, an engine mounted forwardly of said frame, a pivoted casing mounted substantially centrally of said frame, a clutch, a change speed gear, and differential elements carried by said casing, a flexible element connected between the engine and the clutch element, a pair of oppositely extending drive shafts connected with the differential, an axle, a pair of drive wheels mounted upon said axle, flexible driving elements connected between said oppositely extending drive shafts and said drive wheels, a rotatable eccentric shaft connected with said frame, and means connected between said eccentric shaft and said axle for adjusting the tension of said last named flexible driving elements.

7. In a vehicle of the type described, a frame, an axle resiliently connected to said frame, drive wheels mounted upon said axle, bearings carried by said frame, drive shafts mounted in said bearings, flexible driving elements connected between said shaft and said drive wheels, arms carried by said bearings, eccentric shafts rotatably mounted in said arms, and means connected between said eccentric shafts and said axle for varying the tension of said flexible driving elements.

In testimony whereof we affix our signatures in presence of two witnesses.

ALBERT BIAGI.
GIACOMO CASALIS.

Witnesses:
 FRANK B. COONS,
 JOHN R. COLGAN.